United States Patent
Pham

(10) Patent No.: US 11,425,060 B2
(45) Date of Patent: Aug. 23, 2022

(54) SYSTEM AND METHOD FOR TRANSMITTING A RESPONSE IN A MESSAGING APPLICATION

(71) Applicant: Google LLC, Mountain View, CA (US)

(72) Inventor: Hung Pham, Kirkland, WA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 16/712,093

(22) Filed: Dec. 12, 2019

(65) Prior Publication Data

US 2020/0120048 A1 Apr. 16, 2020

Related U.S. Application Data

(63) Continuation of application No. 15/710,428, filed on Sep. 20, 2017, now Pat. No. 10,581,766.
(Continued)

(51) Int. Cl.
*H04L 51/02* (2022.01)
*G06Q 10/10* (2012.01)
(Continued)

(52) U.S. Cl.
CPC .............. *H04L 51/02* (2013.01); *G06Q 10/10* (2013.01); *H04L 51/04* (2013.01); *H04L 51/08* (2013.01); *H04L 51/24* (2013.01); *H04L 51/32* (2013.01)

(58) Field of Classification Search
CPC ...... G06F 3/0488; G06F 3/0482; G06F 3/016; H04W 12/08; H04W 12/02; H04W 12/68;
(Continued)

(56) References Cited

U.S. PATENT DOCUMENTS 8,385,975 B2 * 2/2013 Forutanpour ..... H04M 3/53391
455/418
8,996,639 B1 * 3/2015 Faaborg .................. H04L 51/02
455/412.2
(Continued)

FOREIGN PATENT DOCUMENTS

JP 2013-25648 2/2013
JP 2014-134903 7/2014
(Continued)

OTHER PUBLICATIONS

Zibreg, C. "iOS 9.1 enables quick-replying from notifications in WhatsApp for iPhone" printed from idownloadblog.com, Oct. 22, 2015 (Year: 2015).*
(Continued)

*Primary Examiner* — David R Lazaro
(74) *Attorney, Agent, or Firm* — IP Spring

(57) ABSTRACT

Techniques for transmitting a response in a messaging application via a notification can include receiving, at a computing device having one or more processors, an electronic message via a messaging application. The technique can also include outputting, at the computing device, a notification of the electronic message via a system level notification function when the messaging application is executing in a background of the computing device. The notification can include an identifier of a sender of the electronic message, at least a portion of the electronic message, and one or more suggested responses to the electronic message. The technique can further include receiving a selection of a particular response of the one or more suggested responses via the notification, and transmitting, via the messaging application, the particular response for sending to the sender of the electronic message while the
(Continued)

messaging application is executing in the background of the computing device.

20 Claims, 11 Drawing Sheets

Related U.S. Application Data

(60) Provisional application No. 62/397,325, filed on Sep. 20, 2016.

(51) Int. Cl.
*H04L 51/52* (2022.01)
*H04L 51/04* (2022.01)
*H04L 51/08* (2022.01)
*H04L 51/224* (2022.01)

(58) Field of Classification Search
CPC ..... H04W 4/14; H04M 1/72436; H04L 51/24; H04L 51/04; H04L 51/02; H04L 51/10; H04L 51/16; H04L 51/22; H04L 51/38; H04L 51/12; H04L 51/26; H04L 51/32
See application file for complete search history.

(56) References Cited

U.S. PATENT DOCUMENTS

| | | | | |
|---|---|---|---|---|
| 9,100,809 | B2* | 8/2015 | Olincy | H04W 4/16 |
| 9,720,955 | B1* | 8/2017 | Cao | G06F 3/04886 |
| 10,205,684 | B2* | 2/2019 | Patil | G06F 40/274 |
| 10,547,574 | B2* | 1/2020 | Pham | G06F 3/04842 |
| 10,581,766 | B2* | 3/2020 | Pham | G06Q 10/10 |
| 10,979,373 | B2* | 4/2021 | Pham | H04L 51/08 |
| 2005/0204138 | A1* | 9/2005 | Chiu | G06F 21/6209 713/170 |
| 2008/0195388 | A1* | 8/2008 | Bower | G10L 15/19 704/E15.021 |
| 2009/0245500 | A1* | 10/2009 | Wampler | H04M 7/006 379/265.09 |
| 2011/0082727 | A1* | 4/2011 | Macias | G06Q 30/02 705/14.4 |
| 2011/0087742 | A1* | 4/2011 | Deluca | G06Q 10/107 709/206 |
| 2011/0087743 | A1* | 4/2011 | Deluca | G06Q 10/107 709/206 |
| 2011/0087744 | A1* | 4/2011 | Deluca | G06Q 10/107 709/206 |
| 2011/0302249 | A1* | 12/2011 | Orr | G06Q 10/107 709/206 |
| 2012/0192076 | A1* | 7/2012 | Rocca | G06Q 50/16 715/738 |
| 2013/0102281 | A1* | 4/2013 | Kanda | G06F 21/36 455/410 |
| 2013/0328665 | A1* | 12/2013 | Cranfill | G06F 9/542 340/7.55 |
| 2014/0004889 | A1* | 1/2014 | Davis | H04L 51/16 455/466 |
| 2014/0025616 | A1* | 1/2014 | Yoshida | G06F 3/023 706/46 |
| 2014/0057610 | A1* | 2/2014 | Olincy | H04W 4/16 455/414.1 |
| 2014/0082065 | A1* | 3/2014 | Anakata | H04L 67/26 709/203 |
| 2014/0214605 | A1* | 7/2014 | Argue | G06Q 30/0639 705/26.9 |
| 2015/0032724 | A1* | 1/2015 | Thirugnanasundaram | G06Q 10/10 707/722 |
| 2015/0127755 | A1* | 5/2015 | Roh | H04L 51/34 709/206 |
| 2015/0244687 | A1* | 8/2015 | Perez | H04L 51/24 726/4 |
| 2015/0295863 | A1* | 10/2015 | Ye | G06F 9/542 715/752 |
| 2015/0302301 | A1* | 10/2015 | Petersen | G06Q 10/107 706/11 |
| 2015/0350147 | A1* | 12/2015 | Shepherd | G06F 3/0488 715/752 |
| 2016/0044091 | A1 | 2/2016 | Doumet | |
| 2016/0218997 | A1* | 7/2016 | Patil | G06F 40/274 |
| 2016/0224524 | A1* | 8/2016 | Kay | G06F 3/0237 |
| 2016/0234264 | A1* | 8/2016 | Coffman | H04L 65/4053 |
| 2016/0330144 | A1* | 11/2016 | Dymetman | G06F 16/48 |
| 2017/0048378 | A1* | 2/2017 | Rubinstein | G06F 3/0482 |
| 2017/0054670 | A1* | 2/2017 | Lee | H04L 51/24 |
| 2017/0078235 | A1* | 3/2017 | Cannata | H04L 51/24 |
| 2017/0109338 | A1* | 4/2017 | Page | G06F 3/14 |
| 2017/0222961 | A1* | 8/2017 | Beach | H04L 51/16 |
| 2017/0277667 | A1* | 9/2017 | Weston | G06F 3/0482 |
| 2017/0339076 | A1* | 11/2017 | Patil | G06N 5/04 |
| 2017/0351342 | A1* | 12/2017 | Kandur Raja | G06F 3/0237 |
| 2018/0013844 | A1* | 1/2018 | Foged | H04L 67/22 |
| 2018/0024991 | A1* | 1/2018 | Baldwin | G06F 16/24575 704/9 |
| 2018/0026929 | A1* | 1/2018 | Nambiar | H04L 51/24 709/206 |
| 2018/0048762 | A1* | 2/2018 | Kats | H04M 1/2757 |
| 2018/0083895 | A1* | 3/2018 | Pham | H04L 51/02 |
| 2018/0083898 | A1* | 3/2018 | Pham | G06F 3/04842 |
| 2018/0089588 | A1* | 3/2018 | Ravi | G06N 20/00 |
| 2018/0159805 | A1* | 6/2018 | Jones | G06Q 10/10 |
| 2018/0367483 | A1* | 12/2018 | Rodriguez | H04L 51/04 |
| 2018/0367484 | A1* | 12/2018 | Rodriguez | H04L 67/36 |
| 2020/0053206 | A1* | 2/2020 | Kats | H04M 1/72439 |
| 2020/0106726 | A1* | 4/2020 | Pham | G06F 40/274 |
| 2020/0120048 | A1* | 4/2020 | Pham | G06Q 10/10 |
| 2021/0243143 | A1* | 8/2021 | Pham | G06F 40/274 |

FOREIGN PATENT DOCUMENTS

| | | |
|---|---|---|
| JP | 2015-115892 | 6/2015 |
| JP | 2016-051186 | 4/2016 |
| JP | 2017-041239 | 2/2017 |
| JP | 2015-215914 | 5/2017 |

OTHER PUBLICATIONS

USPTO, Notice of Allowance in U.S. Appl. No. 15/710,428, dated Oct. 23, 2019, 18.

Adam, "Best Practices: Web Push Character Limits", mobify.com, https://www.mobify.com/insights/web-push-character-limits/, Jul. 13, 2016.

EPO, Communication pursuant to Rules 161 (1) and 162 EPC mailed for EP application No. 17780932.4, dated Feb. 27, 2019, 3 pages.

USPTO, Non-Final Office Action mailed for U.S. Appl. No. 15/710,428, dated Jun. 27, 2019, 11 pages.

WIPO, International Preliminary Report on Patentability mailed for international application No. PCT/US2017/052524, dated Mar. 26, 2019, 7 pages.

WIPO, International Search Report and Written Opinion mailed for international application No. PCT/US2017/052524, dated Nov. 28, 2017, 9 pages.

"First Examination Report in IN Application No. 201947003358", dated May 3, 2021, 8 Pages.

"Japanese Office Action dated Mar. 30, 2021 in JP Application No. 2020-101988", 2 pages.

"Preliminary Opinion of the Examining Division dated Mar. 31, 2021 in EP Application No. 17780932.4", 27 pages.

JPO, Notice of Allowance in Japanese Application No. 2019-505063, dated May 19, 2020, 2 pages.

JPO, Office Action in Japanese Application No. 2019-505063, dated Feb. 4, 2020, 8 pages.

EPO, Communication Pursuant to Article 94(3) EPC for European Patent Application No. 17780932.4, dated Feb. 28, 2020, 6 pages.

(56) References Cited

OTHER PUBLICATIONS

"Notice of Allowance in JP Application No. 2020-01988", dated Jun. 29, 2021.

* cited by examiner

SYSTEM AND METHOD FOR TRANSMITTING A RESPONSE IN A MESSAGING APPLICATION

CROSS-REFERENCE TO RELATED APPLICATIONS

This application is a continuation of, and claims priority to, U.S. patent application Ser. No. 15/710,428, filed Sep. 20, 2017, which claims the benefit of U.S. Provisional Application No. 62/397,325, filed Sep. 20, 2016, the contents of which are incorporated herein by reference in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user of a messaging application (instant messaging, SMS or other text messaging, email, etc.) will often utilize her or his computing device to send and receive messages. In some cases, the messaging application may provide a notification of a newly received message via a notification function of the operating system of the computing device. The notification function may provide an audible, visible, and/or tactile (e.g., haptic feedback) notification to the user. If the mobile device provides a visible notification, a user may select (touch, click, etc.) the notification, which launches the messaging application. In this manner, a user may launch the messaging application and read/hear/view the newly received message.

SUMMARY

Various techniques for transmitting a response in a messaging application via a notification is disclosed. The techniques can include receiving, at a computing device having one or more processors, an electronic message via a messaging application. The techniques can also include outputting, at the computing device, a notification of the electronic message via a system level notification function when the messaging application is executing in a background of the computing device. The notification can include an identifier of a sender of the electronic message, at least a portion of the electronic message, and one or more suggested responses to the electronic message. The techniques can further include receiving a selection of a particular response of the one or more suggested responses via the notification, and transmitting, via the messaging application, the particular response for sending to the sender of the electronic message while the messaging application is executing in the background of the computing device.

In other aspects, the present disclosure is directed various techniques for transmitting a response in a messaging application via a notification. The techniques can include receiving, at a first computing device having one or more processors, an electronic message posted via a messaging application. Further, the techniques can include generating, at the first computing device, one or more suggested responses to the electronic message, and transmitting, by the first computing device, the one or more suggested responses for output via a system level notification function in the messaging application that is executing in a background of a second computing device.

In addition to the above, the present disclosure is directed to a computing device and a computing system for performing the above techniques. Also disclosed is a non-transitory computer-readable storage medium having a plurality of instructions stored thereon, which, when executed by one or more processors, cause the one or more processors to perform the operations of the above techniques.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
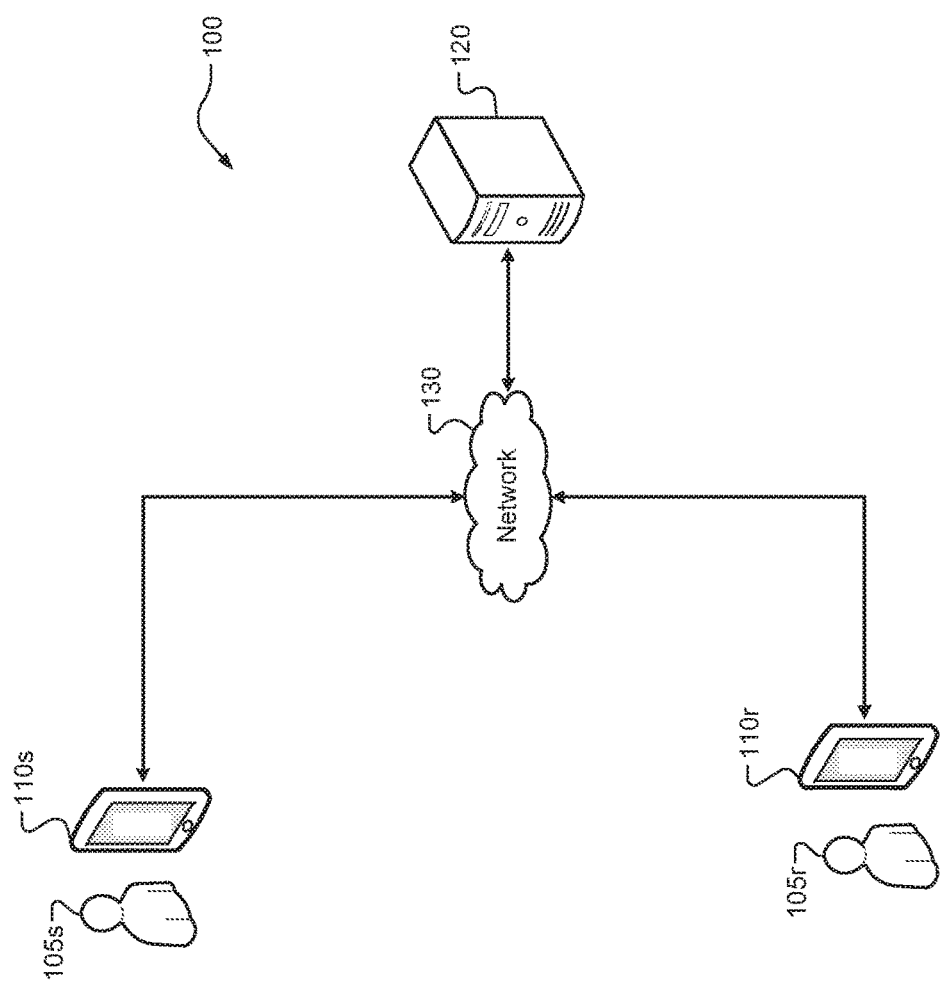
FIG. 1 is a diagram of an example computing system including example computing devices and an example server computing device according to some implementations of the present disclosure.

As briefly mentioned above, a user of a messaging application (instant messaging, SMS or other text messaging, email, etc.) may utilize her or his mobile device or other computing device to send and receive messages. A user may be presented with a notification of a newly received message, e.g., via a notification function of the computing device operating system. The notification function may provide an audible, visible, and/or tactile notification to the user even if the messaging application is executing in a background of the computing device. The user may interact with the notification, e.g., by selecting (touch, click, etc.) the notification, which launches the messaging application in which the user may read/hear/view the newly received message. In order to respond to the newly received message, the user may select a response functionality of the launched messaging application, input the response, and send the response to the other user.

Thus, in the typical arrangement described above, a user must launch and interact with a messaging application executing in the foreground of the computing device in order to respond to a newly received message. It would be desirable to provide a system and method that permits a user to quickly and easily provide a response to a newly received electronic message without launching or otherwise causing the messaging application to execute in the foreground of the computing device. The present disclosure is directed to such a system and method, as well as a non-transitory computer-readable medium that stores instructions for performing the method. While not limited to such an implementation, the present disclosure may be particularly well-suited for instant messaging or other forms of text messaging applications that are utilized to provide real-time communication between users.

The present disclosure is directed to solving, inter alia, the objective technical problems of receiving user input in a messaging application and transmitting electronic messages via a messaging application. In order to achieve the above identified and other technical objectives, the present disclosure is directed to a system and method for generating and transmitting a response to a newly received message via a notification output by a messaging application executing in a background of the computing device. More specifically, the present disclosure provides for a system and method that receives a new electronic message while the associated messaging application is executing in the background of the computing device. A notification is output by the computing device, where the notification includes one or more suggested responses to the new electronic message.

The suggested response(s) may be generated by the computing device, a server in communication with the computing device, or a combination thereof, based on the received electronic message and a model (e.g., a language model) trained to generate one or more probable responses to received electronic messages. From the notification, a user may select one of the suggested responses, which will be transmitted to the sender of the original electronic message without launching the messaging application (e.g., executing the messaging application in the foreground). In this manner, a user may quickly and easily provide a response to a newly received electronic message from the notification functionality of the computing device and without launching or otherwise causing the messaging application to execute in the foreground of the computing device.

In addition to the above, the present disclosure can provide additional technical benefits over typical methods for generating and transmitting responses in a messaging application. For example only, because the user interacts with the notification to send a message while the messaging application is executing in the background of the computing device, the computing device does not have to reload the parameters of the messaging application, switch the current application executing in the foreground to the messaging application, and/or refresh the display of the computing device. This also eliminates the need for the computing device to recreate the present state of the messaging application, such as by retrieving the previously sent messages (from memory or from a server or other network device), refreshing and reloading the graphical user interface of the messaging application, and displaying the retrieved messages. This can, e.g., increase the speed of operation of the computing device by requiring less operations to achieve the same result, as well as reduce the number of memory retrieval/storage operations.

An additional technical benefit of the present disclosure is that the computing resources directed to the application executing in the foreground of the computing device need not be switched to loading and executing the messaging application in order to generate and transmit a response. An application executing in the foreground of the computing device may have priority over the computing resources of the computing device. By enabling the transmission of messages through the messaging application while it is executing in the background, the present disclosure reduces the latency of transmitting a message by eliminating the delay associated with switching the messaging application to the foreground. Furthermore, because there is switching of the foreground application, the operations, latency, etc. associated with switching the messaging application back to the background of the computing device can be eliminated. This may also have the additional benefit of reducing the refresh operations of the display, thereby reducing the power consumption of the computing device.

Additionally, by providing suggested responses to the user, the present disclosure may reduce the number of inputs required to receive and transmit a response in a messaging application. For example only, a typical response may be received via a keyboard application, in which the user provides a plurality of inputs (corresponding to selected characters) to generate a response. Rather than requiring a user input for each character of a response, which may require a processing step for each input, the present disclosure contemplates a simple selection and a single user input to both select and transmit a desired response. In this manner, the computing device may reduce the use of power and other computing resources associated with the individual processing of the plurality of user inputs.

More specifically, a computer-implemented method may comprise:

receiving, at a computing device having one or more processors, an electronic message via a messaging application;

outputting, at the computing device, a notification of the electronic message via a system level notification function when the messaging application is executing in a background of the computing device, the notification including an identifier of a sender of the electronic message, at least a portion of the electronic message, and one or more suggested responses to the electronic message;

receiving, at the computing device, a selection of a particular response of the one or more suggested responses via the notification; and in response to the selection of the particular response, transmitting, from the computing device and via the messaging application, the particular response for sending to the sender of the electronic message while the messaging application is executing in the background of the computing device.

The computer-implemented method may also comprise, in response to a user selection of the portion of the electronic message, switching the messaging application to execute in a foreground of the computing device.

Furthermore, it is an object of the invention to provide a computing device, comprising one or more processors and a non-transitory computer-readable storage medium having a plurality of instructions stored thereon, which, when executed by the one or more processors, cause the one or more processors to perform the operations of the computer-implemented method.

Referring now to FIG. 1, a diagram of an example computing system 100 is illustrated. The computing system 100 can be configured to implement an electronic messaging communication network amongst a plurality of users via their computing devices. The computing system 100 can include a plurality of example computing devices 110 and an example server 120 that communicate via a network 130 according to some implementations of the present disclosure.

For ease of description, in this application and as shown in FIG. 1, two example computing devices 110 are illustrated and described: a sending computing device 110s that is associated with a sender user 105s, and a receiving computing device 110r that is associated with a receiving user 105r. It should be appreciated, however, that each of the computing devices 110s and 110r can both send and receive electronic messages and, thus, can be described as the "sending" computing device or the "receiving" computing device (and, similarly, the "sending" user or the "receiving" user) depending on the circumstances and the particular electronic message that is being discussed.

Figure 2:
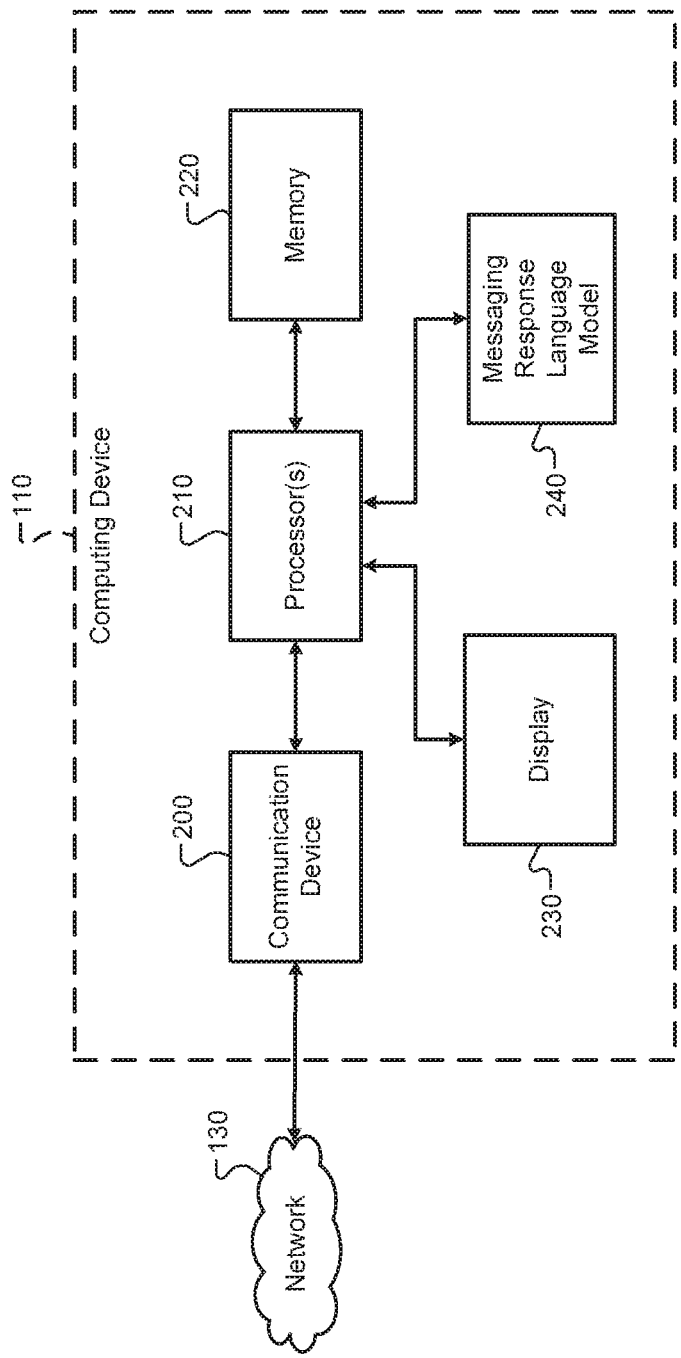
FIG. 2 is a functional block diagram of one of the example computing devices of FIG. 1.

While illustrated as mobile phones ("smart" phones), each computing device 110 can be any type of suitable computing device, such as a desktop computer, a tablet computer, a laptop computer, a wearable computing device such as eyewear, a watch or other piece of jewelry, or clothing that incorporates a computing device. A functional block diagram of an example computing device 110 is illustrated in FIG. 2.

The computing device 110 can include a communication device 200, one more processors 210, a memory 220, a display device 230, and a messaging response language model 240. The processor(s) 210 can control operation of the computing device 110, including implementing at least a portion of the techniques of the present disclosure. The term "processor" as used herein is intended to refer to both a single processor and multiple processors operating together, e.g., in a parallel or distributed architecture.

The communication device 200 can be configured for communication with other devices (e.g., the server 120 or other computing devices 110) via the network 130. One non-limiting example of the communication device 200 is a transceiver, although other forms of hardware are within the scope of the present disclosure. The memory 220 can be any suitable storage medium (flash, hard disk, etc.) configured to store information. For example, the memory 220 may store a set of instructions that are executable by the processor 210, which cause the computing device 110 to perform operations, e.g., such as the operations of the present disclosure. The display device 230 can display information to the user 105. In some implementations, the display device 230 can comprise a touch-sensitive display device (such as a capacitive touchscreen and the like), although non-touch display devices are within the scope of the present disclosure.

A language model (such as the messaging language response model 240) can be a probability distribution over a sequence of text (characters, word, phrases, etc.) that is derived from (or "trained" based on) training data. In some implementations, a language model can assign a probability to a piece of unknown text (character, word, phrase, etc.) based on the surrounding text (before and/or after the unknown text) and a corpus of training data upon which the language model is trained. The use of such a labeled training corpus or set can be referred to as a supervised learning process. The messaging response language model 240 can be utilized by the processor 210 to determine one or more suggested responses to a newly received electronic message, as more fully described below. Although illustrated as a separate element, it should be appreciated that the messaging response language model 240 can be partially or wholly implemented by processor 210 and/or the memory 220 (e.g., a database storing the parameters of the messaging response language model 240).

It should be appreciated that the example server computing device 120 can include the same or similar components as the computing device 110, and thus can be configured to perform some or all of the techniques of the present disclosure, which are described more fully below. Further, while the techniques of the present disclosure are described herein in the context of a computing device 110, it is specifically contemplated that each feature of the techniques may be performed by a computing device 110 alone, a plurality of computing devices 110 operating together, a server computing device 120 alone, a plurality of server computing devices 120 operating together, and a combination of one or more computing devices 110 and one or more server computing devices 120 operating together.

Figure 3:
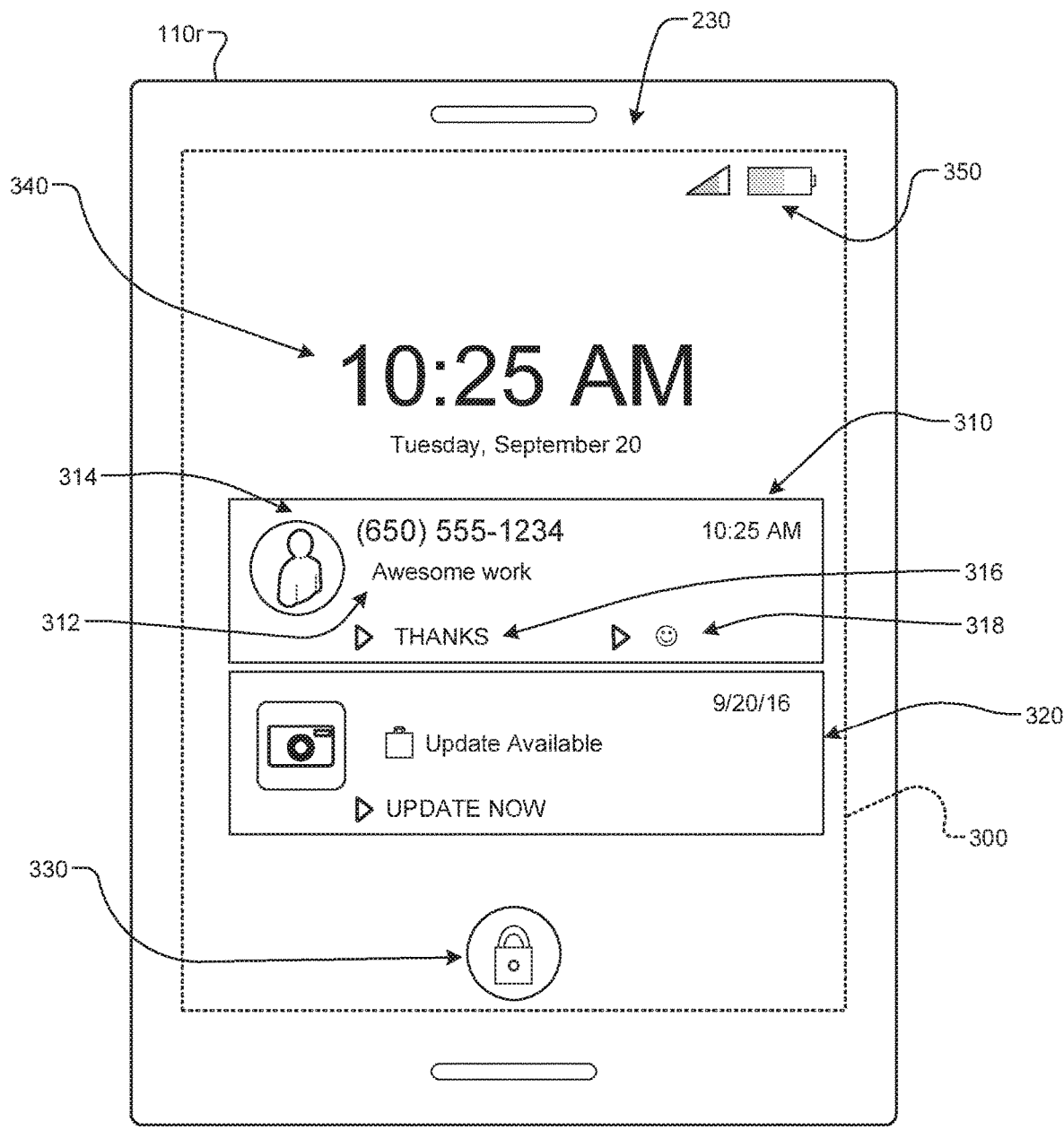
FIG. 3 is a diagram of an example graphical user interface displayed by the example computing device of FIG. 1 according to some implementations of the present disclosure.

With reference to FIG. 3, an example graphical user interface ("GUI") 300 that can be displayed by the display device 230 of the example receiving computing device 110r when executing a messaging application in a background of the example receiving computing device 110r according to certain implementations of the present disclosure is shown. In FIG. 3, the illustrated GUI 300 corresponds to a lock screen of the computing device 110r that is indicative of the computing device 110r being "locked" or otherwise not freely usable.

The illustrated GUI 300 is shown as displaying an example notification 310 of a newly received electronic message 312 ("Awesome work") via a system level notification function when the messaging application is executing in the background of the computing device. A system level notification function can be, e.g., a notification function provided by the operating system of the computing device 112 and/or by an application at a system level (as opposed to an end-user level, such as the messaging application). The illustrated GUI 300 is also shown as displaying an additional notification 320 (corresponding to an available update to another application of computing device 110r), an unlock button 330, a time and date widget 340, and one or more status indicators 350 (corresponding to a battery status, network status, etc.).

The notification 310 as shown includes an identifier 314 of a sender (e.g., sender user 105s) of the electronic message 312, at least a portion of the electronic message 312, and one or more suggested responses 316 ("Thanks"), 318 ("☺") to the electronic message 312. The identifier 314 of the sender user 105s can include, e.g., a picture or other graphic, a name or other textual identifier, and/or a phone number or other contact identifier.

In the illustrated example, the electronic message 312 ("Awesome work") is shown in full. It should be appreciated, however, that the full electronic message 312 may not be displayed in the notification 310, and, instead, a shortened version (clipped, summarized, etc.) may be displayed, depending on the size of the electronic message 312 and/or the display size of the notification 310. Further, it is contemplated that the display size of the notification 310 may be variable and/or take different forms or configurations, as more fully discussed below. For example only, in one configuration, the notification 310 may display a shortened version of the electronic message 312, and in another configuration, the notification 310 may display the full version of the electronic message 312.

The one or more suggested responses 316 ("Thanks"), 318 ("☺") to the electronic message 312 are included in the notification 310 and correspond to probable responses to the electronic message 312, e.g., as determined by the messaging response language model 240. The notification 310 is configured such that the user 105r of the receiving computing device 110r may select a particular response (e.g., suggested response 316—"Thanks") of the one or more suggested responses. In response to the selection of a particular response 316, the computing device 110r may automatically transmit the particular response 316 to the sender user 105s of the electronic message 312 while the messaging application is executing in the background of the computing device 110r. In some implementations, upon transmitting the particular response 316 to the sender user 105s, the messaging application can mark the electronic message 312 (and/or all unread electronic messages) as "read" and remove the notification 310.

As mentioned above, the illustrated GUI 300 corresponds to a lock screen of the computing device 110r that is indicative of the computing device 110r being "locked" or otherwise not freely usable. In some aspects, the computing device 110r can, in response to receiving the selection of the particular response 316 from the notification 310, transmit the particular response 316 to the sender user 105s of the electronic message 312 while the computing device 110r remains otherwise locked and not freely usable. It should be appreciated that the computing device 110r may, in some implementations, require the user 110r to enter a password or other user verification for security purposes in order to transmit the particular response 316. In some such implementations, the computing device 110r may automatically transmit the particular response 316 in the locked configuration and, after the transmission, remain in the locked configuration.

In some implementations, the notification 310 can also or alternatively include a reply option that launches the messaging application. For example only, when the user 105r selects a portion of the notification 310 separate from the one or more suggested responses 316, 318, the computing device 110 may launch the messaging application such that the messaging application is executing in a foreground of the computing device 110r, as described more fully below. Other interactions (swiping, double clicking, etc.) with the notification 310 are also contemplated and which may correspond to particular actions of the computing device 110r.

Figure 4A:
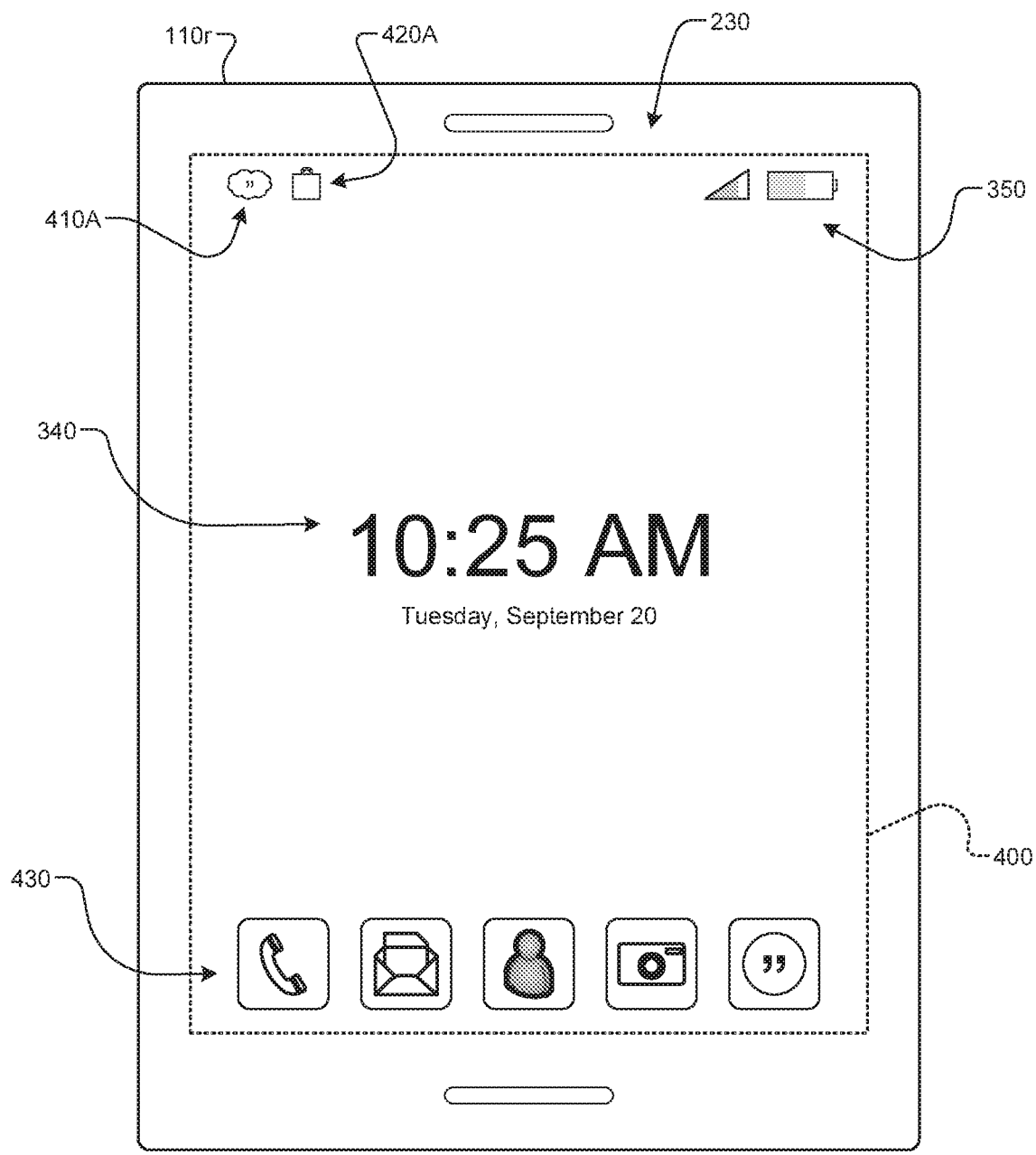
FIGS. 4A-4D are diagrams of an example graphical user interface displayed by the example computing device of FIG. 1 according to some implementations of the present disclosure.

With reference to FIGS. 4A-4D, another example graphical user interface ("GUI") 400 that can be displayed by the display device 230 of the example receiving computing device 110r when executing a messaging application in a background of the example receiving computing device 110r according to certain implementations of the present disclosure is shown. In FIG. 4A, the illustrated GUI 400 corresponds to a "home" screen of the computing device 110r corresponding to the computing device 110r being in an "unlocked" state or otherwise freely usable. The GUI 400 can include one or more of the same elements (the time and date widget 340, one or more status indicators 350, etc.) of GUI 300, which will not be further described.

The illustrated GUI 400 is shown in FIG. 4A as displaying an example notification 410A of a newly received electronic message, such as newly received message 312 ("Awesome work"), via a system level notification function when the messaging application is executing in the background of the computing device. The illustrated GUI 400 is also shown as displaying an additional notification 420A (corresponding to an available update to another application of computing device 110r), and a plurality of application launch icons 430.

Figure 4B:
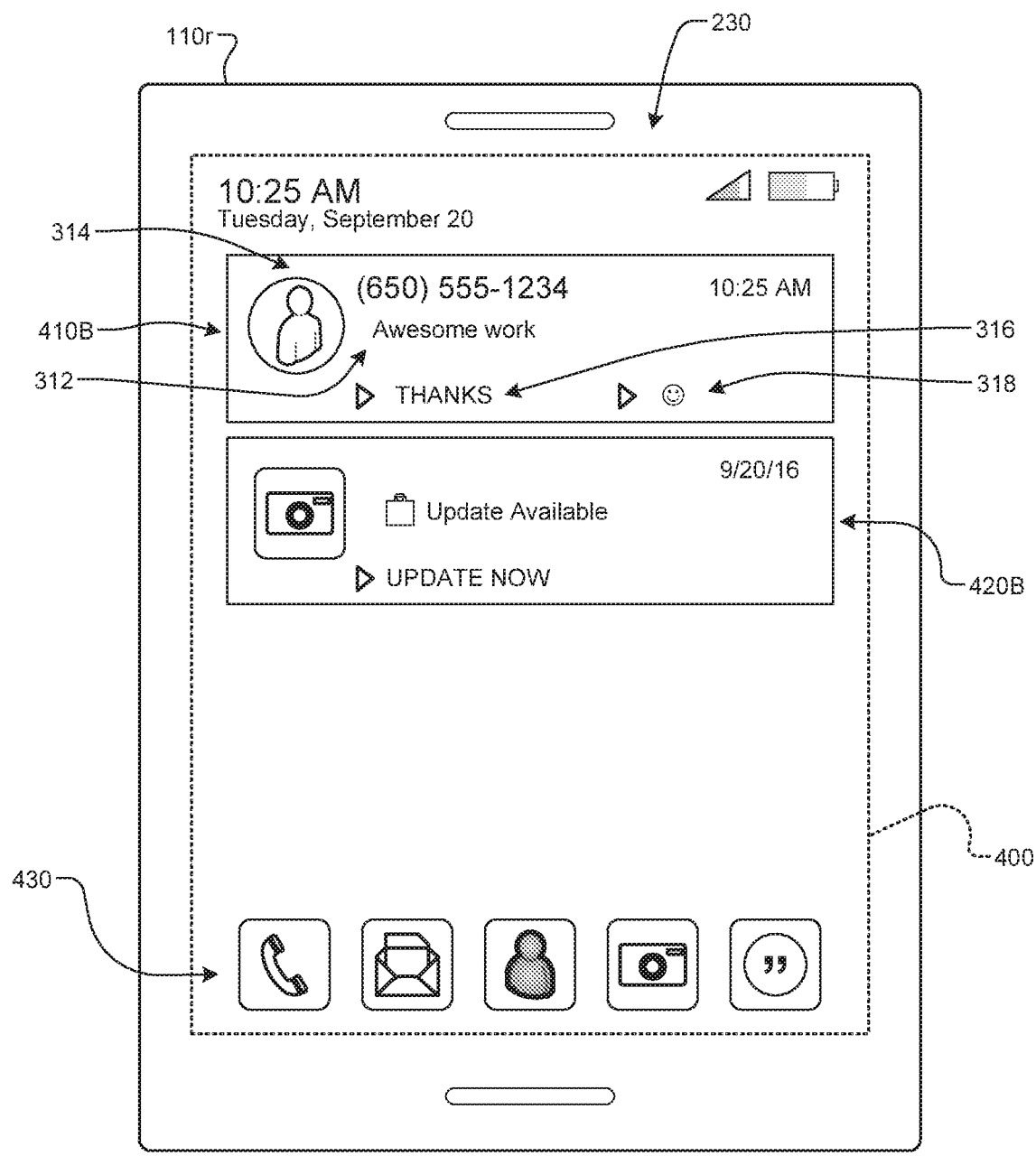

The example notification 410A as shown is merely an icon or other graphical indicator that indicates to the user 110r that an unread electronic message has been received. The notification 410A can be expanded or otherwise reconfigured to correspond to a notification 410B, as shown in FIG. 4B. In some aspects, a user 110r can select the notification 410A, swipe downwardly (or any other direction) from at or near the notification 410A, etc. to expand/reconfigure the notification 410A such that the computing device 110r displays the notification 410B.

Similar to notification 310 described above, notification 410B can include an identifier 314 of a sender (e.g., sender user 105s) of the electronic message 312, at least a portion of the electronic message 312, and one or more suggested responses 316 ("Thanks"), 318 ("☺") to the electronic message 312. In this example, the display size of the notification 410A is variable and/or takes different forms or configurations. It should be appreciated that the notification 410B may also be variable and/or take different forms or configurations (e.g., enlarged or contracted).

The one or more suggested responses 316 ("Thanks"), 318 ("☺") to the electronic message 312 are included in the notification 410B and correspond to probable responses to the electronic message 312, e.g., as determined by the messaging response language model 240. The notification 410B is configured such that the user 105r of the receiving computing device 110r may select a particular response (e.g., suggested response 316—"Thanks") of the one or more suggested responses. In response to the selection of a particular response 316, the computing device 110r may automatically transmit the particular response 316 to the sender user 105s of the electronic message 312 while the messaging application is executing in the background of the computing device 110r.

Figure 4C:
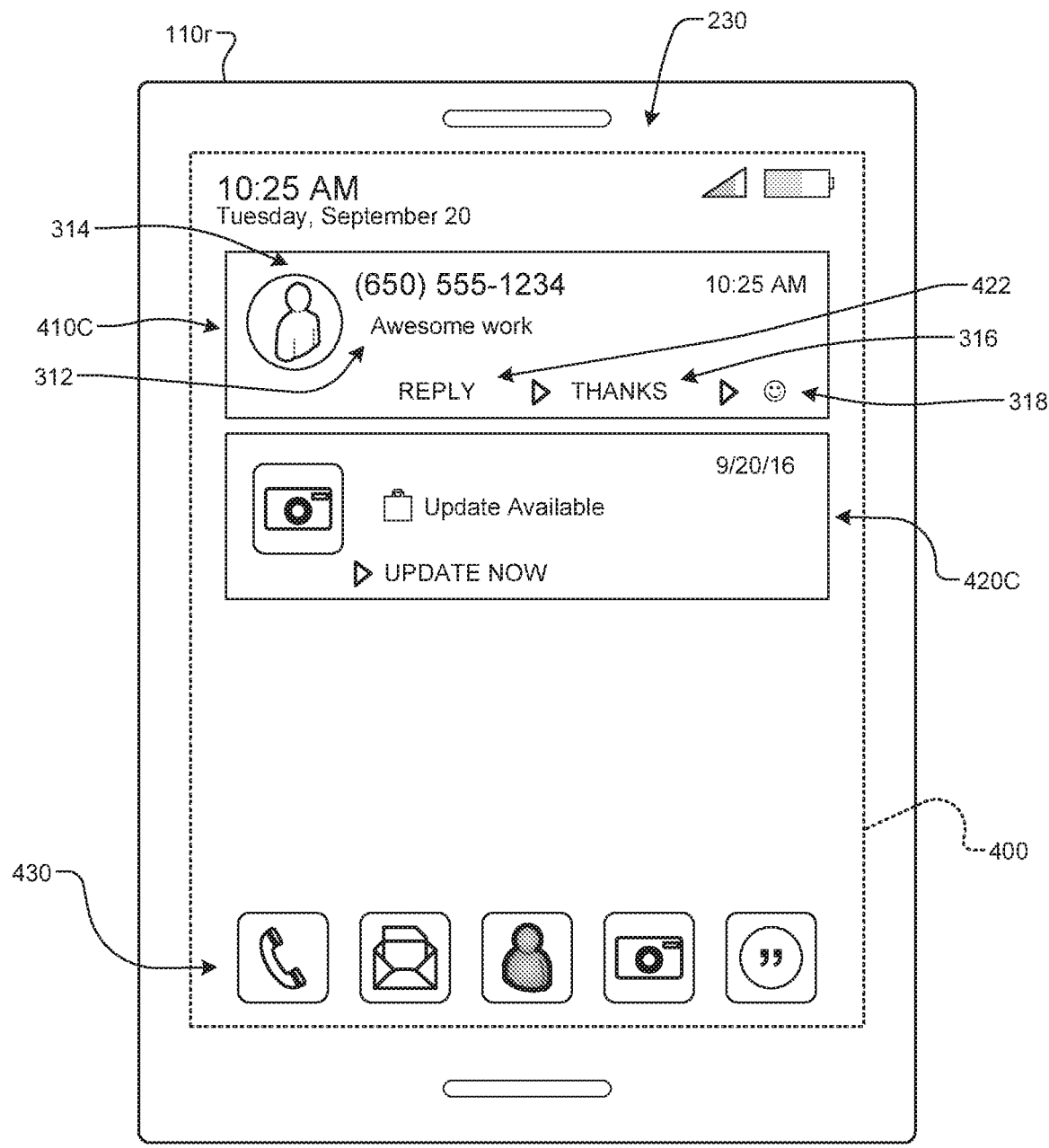
Figure 4D:
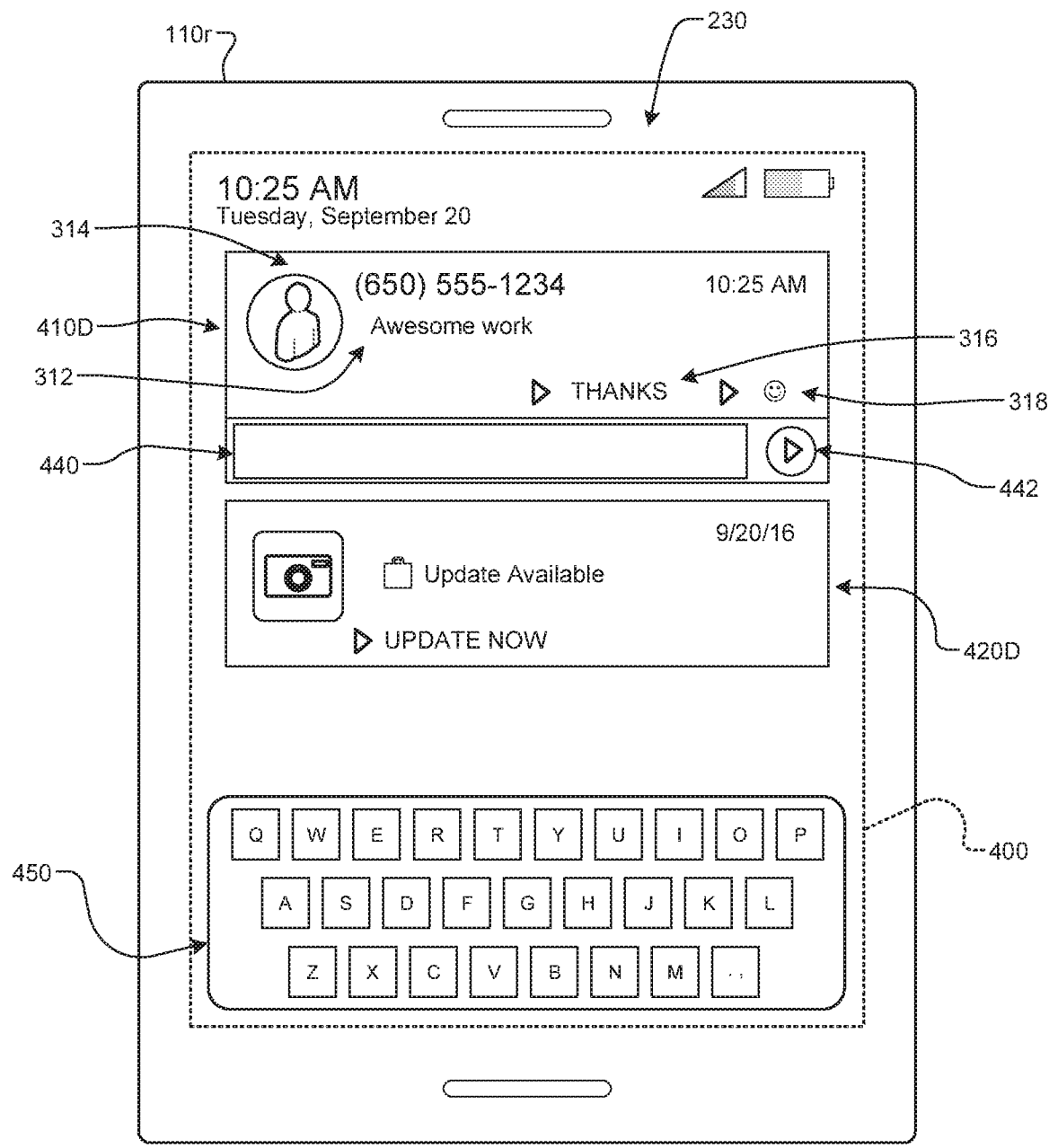

As an alternative, and with reference to FIGS. 4C and 4D, notification 410C can include similar components to notification 410B (an identifier 314 of a sender of the electronic message 312, at least a portion of the electronic message 312, and one or more suggested responses 316 ("Thanks"), 318 ("☺") to the electronic message 312), as well as an additional quick reply option 422 described below. The one or more suggested responses 316 ("Thanks"), 318 ("☺") to the electronic message 312 are included in the notification 410C and correspond to probable responses to the electronic message 312, e.g., as determined by the messaging response language model 240. The notification 410C is configured such that the user 105r of the receiving computing device 110r may select a particular response (e.g., suggested response 316—"Thanks") of the one or more suggested responses. In response to the selection of a particular response 316, the computing device 110r may automatically transmit the particular response 316 to the sender user 105s of the electronic message 312 while the messaging application is executing in the background of the computing device 110r.

As mentioned, the notification 410C is configured to include a quick reply option 422. In response to the selection of the quick reply option 422, the computing device 110r may expand the notification 410C to include an input portion 440 and a keyboard 450 (as shown in notification 410D of FIG. 4D) while the messaging application is executing in the background of the computing device 110r. Notification 410D can permit the receiving user 110r to input text, emoji, images, etc. into the messaging application via the keyboard 450 for transmission to the sending user 110s while the messaging application is executing in the background of the computing device 110r. Once the user 110r has input whatever text, emoji, images, etc. into the input portion 440, the user 110r may selecting the send button 442 to transmit the message to the sending user 105s As shown in FIG. 4D, the one or more suggested responses 316 ("Thanks"), 318 ("☺") to the electronic message 312 may be included in the notification 410D and correspond to probable responses to the electronic message 312, e.g., as determined by the messaging response language model 240, as described above. Alternatively, the one or more suggested responses 316 ("Thanks"), 318 ("☺") to the electronic message 312 may be removed from the GUI 400.

In some implementations, the notification(s) 410A, 410B, 410C, 410D can also or alternatively include a reply option that launches the messaging application directly from the notification(s) 410A, 410B, 410C, 410D. For example only, when the user 105r selects a portion of the notification 410 separate from the one or more suggested responses 316, 318, the computing device 110 may launch the messaging application such that the messaging application is executing in a foreground of the computing device 110r. Other interactions (swiping, double clicking, etc.) with the notification(s) 410A, 410B, 410C, 410D are also contemplated and which may correspond to particular actions of the computing device 110r with respect to the notifications 410A, 410B, 410C, 410D and/or messaging application.

Figure 5:
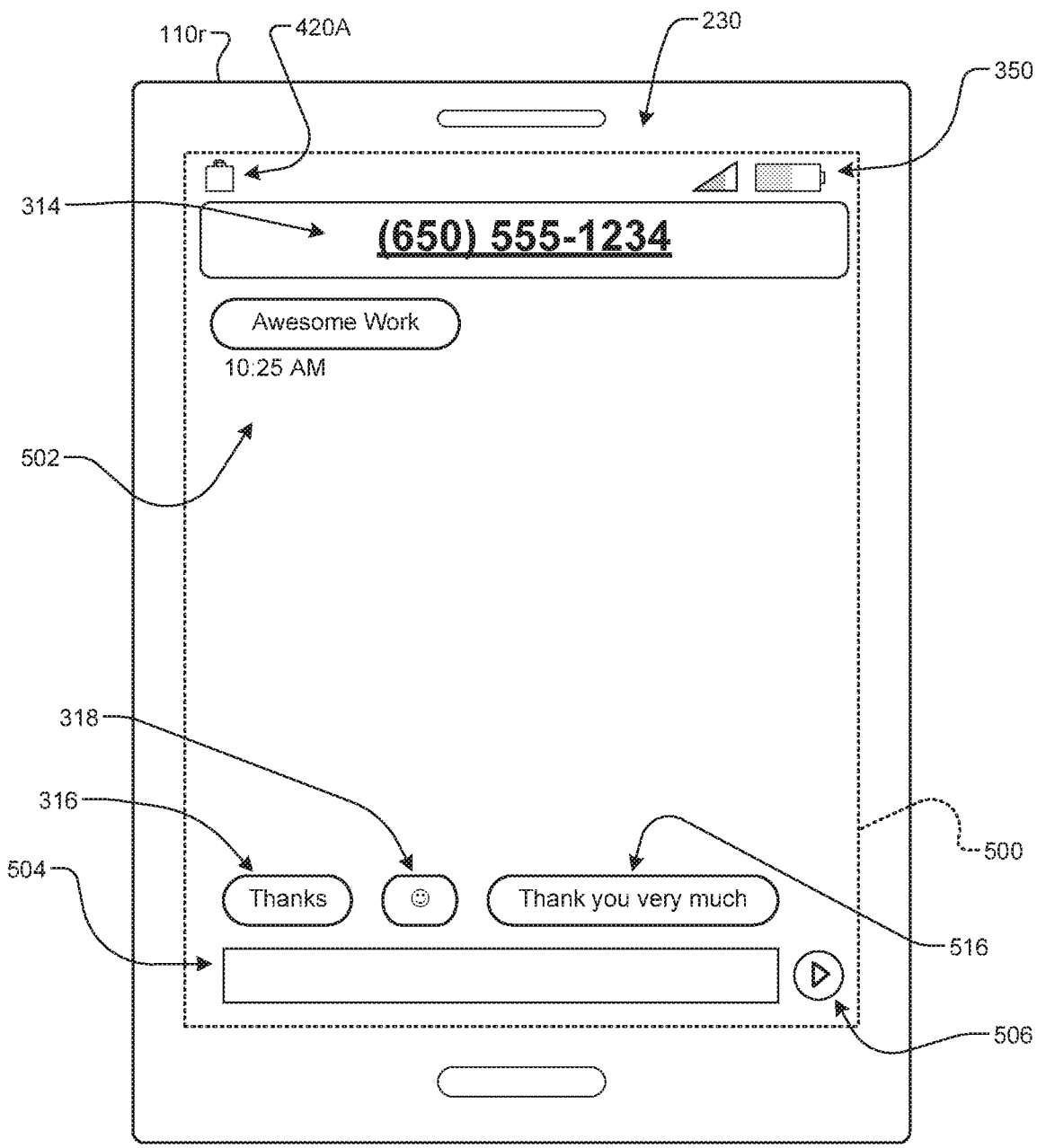
FIG. 5 is a diagram of an example graphical user interface displayed by the example computing device of FIG. 1 according to some implementations of the present disclosure.

With reference to FIG. 5, an example graphical user interface ("GUI") 500 that can be displayed by the display device 230 of the example receiving computing device 110r when executing a messaging application in a foreground of the example receiving computing device 110r according to certain implementations of the present disclosure is shown. In FIG. 5, the illustrated GUI 500 corresponds to a configuration in which a message history 502 between the receiving user 110r and the sender user 110s is displayed. The example GUI 500 also includes the identifier 314 of the sender user 105s of the electronic message 312 (corresponding to telephone number "(650) 555-1234") and an input portion 504 in which the receiving user 110r can input text, emoji, images, etc. into the messaging application for transmission to the sending user 110s. The GUI 500 can further include one or more of the same elements (one or more status indicators 350, notification 420A, etc.) of GUIs 300, 400, which will not be further described.

The illustrated GUI 500 is shown in FIG. 5 as displaying the received message 312 ("Awesome work"), as well as the one or more suggested responses 316 ("Thanks"), 318 ("☺") and at least one additional full length potential response 516 ("Thank you very much"). The GUI 500 may be displayed to the receiving user 110r, e.g., in response to the receiving user 110r selecting the reply option from one of the notifications 310, 410A, 410B. More specifically, rather than the receiving user 110r selecting one of the suggested responses 316, 318, the receiving user 110r may instead select a different portion of the notifications 310, 410B. In response thereto, the computing device 110r may launch the messaging application such that it is executing in the foreground of the computing device 110r and present the GUI 500 to the user.

As described more fully below, the at least one additional full length potential response 516 ("Thank you very much") may or may not be different from the one or more suggested responses 316, 318. In certain aspects, the one or more suggested responses 316, 318 correspond to probable responses to the electronic message 312 (e.g., as determined by the messaging response language model 240) that satisfy a character (or other form of length) threshold. In contrast, the at least one additional full length potential response 516 may correspond to probable responses to the electronic message 312 without regard to a character (or other form of length) threshold. Additionally or alternatively, the at least one additional full length potential response 516 may correspond to probable responses to the electronic message 312 that satisfy a second character (or other form of length) threshold different than that associated with the one or more suggested responses 316, 318.

For example only, there may be less available display space for suggested responses/potential responses in the notifications 310, 410B than in the messaging application GUI 500. Accordingly, the one or more suggested responses 316, 318 that can be displayed in the notifications 310, 410B may be limited to probable responses that are constrained in size such that the one or more suggested responses 316, 318 can be fully displayed in the notifications 310, 410B. Because there may be more available display space in the messaging application GUI 500, however, the at least one additional full length potential response 516 may not be so limited (or may be differently limited) and/or more suggested/potential responses may be displayed in the GUI 500.

In some embodiments, when a notification (e.g., notifications 310, 410B) that includes one or more suggested responses 316, 318 has been displayed to the receiving user 110r and then the messaging application is switched to the foreground of the receiving computing device 105r, the one or more suggested responses 316, 318 and the at least one additional full length potential response 516 may be displayed. For example only, the one or more suggested responses 316, 318 and the at least one additional full length potential response 516 can be displayed in a ranked order in which the previously displayed one or more suggested responses 316, 318 precede the at least one additional full length potential response 516. In this manner, the receiving user 110r can be presented with probable responses to the electronic message 312 that are consistent across the notifications 310, 410B and the GUI 500.

Alternatively, upon selection of the reply option (as discussed above), one or more additional suggested responses different from the previously displayed one or more suggested responses 316, 318 can be generated and displayed in the GUI 500. In this manner, the receiving user 110r can be presented with many different options for selecting a probable response based on the assumption that, if the receiving user 110r desired to response with one of the one or more suggested responses 316, 318 displayed in the notification 310, 410B, the user 110r would have selected to respond via the notification 310, 410B directly and would not have selected the reply option.

Upon selection of one probable response of the one or more suggested responses 316, 318 or the at least one additional full length potential response 516, the input portion 504 of the GUI 500 may be populated with the selected probable response, for editing and/or transmission to the sending user 105s, e.g., upon the user 105r selecting a send button 506. Alternatively, selection of one probable response of the one or more suggested responses 316, 318 or the at least one additional full length potential response 516 by the receiving user 105r may automatically transmit the selected probable response to the sending user 105s without further input from the receiving user 105r.

Figure 6:
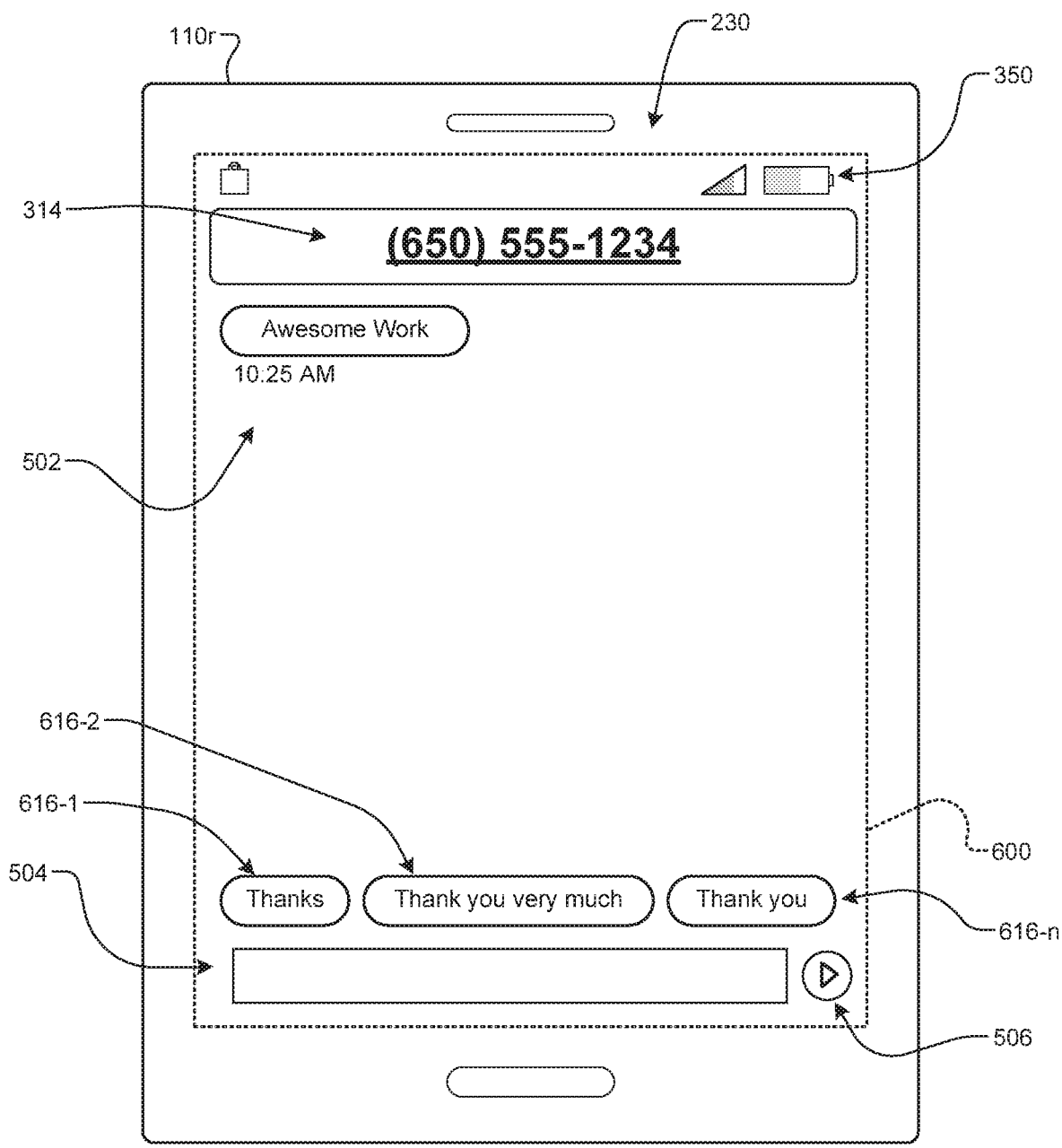
FIG. 6 is a diagram of an example graphical user interface displayed by the example computing device of FIG. 1 according to some implementations of the present disclosure.

In some embodiments, and with further reference to FIG. 6, when a notification that includes one or more suggested responses 316, 318 has not been displayed to the receiving user 110r (e.g., because notifications are turned off, or because the messaging application is executing in the foreground of the receiving computing device 105r and no notifications are displayed), one or more full length suggested responses 616-1, 616-2, . . . 616-n (individually and collectively referred to herein as "full length suggested response(s) 616") different from the one or more suggested responses 316, 318 can be displayed.

As mentioned above, in some implementations, the one or more suggested responses 316, 318 may be selected based on one or more criteria related to character or other length threshold, e.g., due to the constrained display space provided by a notification 310, 410B. Accordingly, because the GUI 600 has a different amount of available display space, the full length suggested response(s) 616 may not be constrained according to a character or other length threshold, or may be constrained according to a different length threshold. Therefore, the full length suggested response(s) 616 may or may not differ from the one or more suggested responses 316, 318 that would be generated for display in a notification 310, 410B. As shown in FIG. 6, the full length suggested response 616-1 corresponds to the suggested response 316 ("Thanks"), while the full length suggested response 616-2 ("Thank you very much") does not correspond to any of the one or more suggested responses 316, 318.

Figure 7:
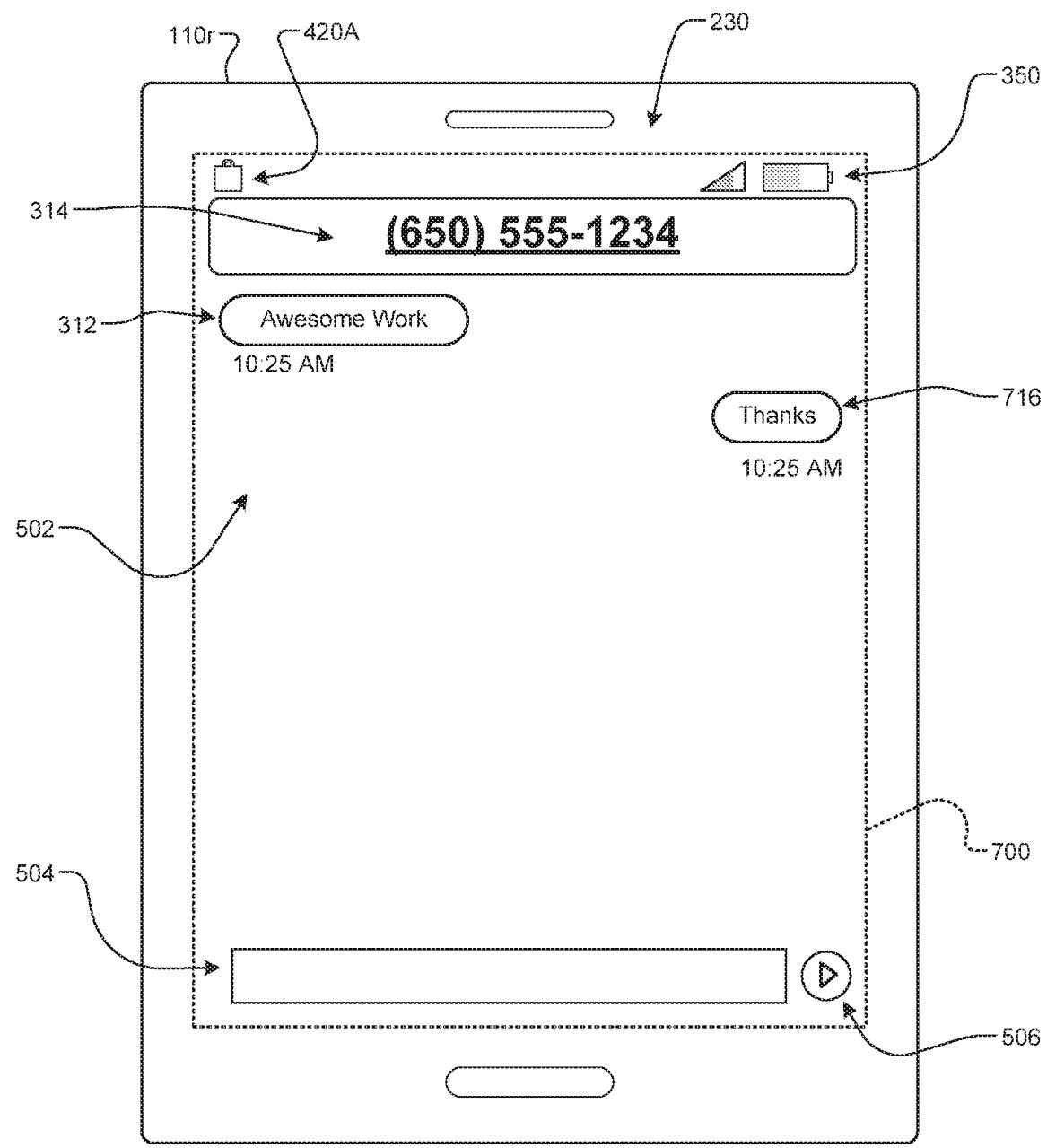
FIG. 7 is a diagram of an example graphical user interface displayed by the example computing device of FIG. 1 according to some implementations of the present disclosure.

An example graphical user interface ("GUI") 700 that can be displayed by the display device 230 of the example receiving computing device 110r when a messaging application is executing in the foreground according to certain implementations of the present disclosure is shown in FIG. 7. Specifically, FIG. 7 relates to a GUI 700 of the messaging application after transmitting a response message 716 ("Thanks") to the sending user 105s. The GUI 700 can further include one or more of the same elements (one or more status indicators 350, notification 420A, etc.) of GUIs 300, 400, 500, 600 which will not be further described.

As described above, the receiving user 105r can transmit the response message 716 (which corresponds to the suggested response 316 and the full length suggested response 616-1 described above) in various ways. For example only, and with reference to FIG. 3, the user 110r can select the suggested response 316 from the notification 310, which will result in the transmission of the response message 716 to the sending user 105s via the messaging application. In other examples, and with reference to FIGS. 4B and 5, the user 110r can select the suggested response 316 from the notification 410B or the GUI 500, which will result in the transmission of the response message 716 to the sending user 105s via the messaging application. In yet another example (FIG. 6), the user 110r can select the full length suggested response 616-1 from the GUI 600, which can be transmitted as the response message 716 to the sending user 105s via the messaging application.

As mentioned above, the messaging response language model 240 can be utilized by the processor 210 to determine one or more suggested responses (such as, the one or more suggested responses 316, 318, the at least one additional full length potential response 516, and/or the one or more full length suggested responses 616) to a newly received electronic message (electronic message 312). While shown in FIG. 2 as being a component of the example computing device 110, it should be appreciated that the messaging response language model 240 can instead be a component of the server computing device 120, or, alternatively, be implemented by the example computing device 110 and one or more server computing devices 120 working in conjunction. Accordingly, where possible the messaging response language model 240 will be described separately from the specific computing device(s) (computing device 110, and/or server computing device(s) 120) with which it is implemented, and any description of the messaging response language model 240 with respect to a specific computing device is equally applicable, mutatis mutandis, to any other computing device or devices. Furthermore, it is within the scope of the present disclosure that the messaging response language model 240 can be adapted over time based on the interactions with a user (such as user 105r). In this manner, the messaging response language model 240 can be better tuned to provide better, more accurate suggested responses.

The messaging response language model 240 can be a probability distribution over a sequence of electronic messages (that include characters, word, phrases, emoji, etc.) that is derived from (or "trained" based on) training data. For example only, the message response language model 240 can assign a probability to a piece of unknown text (a probable response message, such as, the one or more suggested responses 316, 318, the at least one additional full length potential response 516, and/or the one or more full length suggested responses 616) based on the surrounding text (such as, the electronic message 312 to which the probable response message is to respond) and a corpus of training data upon which the message response language model 240 is trained. The use of such a labeled training corpus or set can be referred to as a supervised learning process.

The messaging response language model 240 can be utilized by the computing device 110 or server computing device 120 to determine one or more suggested responses to a newly received electronic message. More specifically, messaging response language model 240 can generate the one or more suggested responses (responses 316, 318, 516, and/or 616) and their associated probability scores based on one or more preceding messages (electronic message 312).

In some implementations, the messaging response language model 240 can be configured to generate the one or more suggested responses (responses 316, 318, 516, and/or 616) and their associated probability scores based on one or more preceding messages (electronic message 312) and an anticipated display size. In this manner, the one or more suggested responses can be limited in size to correspond to the display area in which they will be presented, e.g., subject to a maximum character limit of the notification 310, 410B on the computing device 110r. Furthermore, by including an anticipated display size as a criterion utilized by the messaging response language model 240, the messaging response language model 240 may associate a higher probability score (or assign a higher priority) to suggested responses having a relatively shorter length (such as, a single word or an emoji character).

In yet another aspect, the messaging response language model 240 can be configured to generate the one or more suggested responses (responses 316, 318, 516, and/or 616) and their associated probability scores based on one or more preceding messages (electronic message 312) and irrespective of any character or size limitations. The suggested responses can then be filtered such that the one or more suggested responses are limited in size to correspond to the display area in which they will be presented, e.g., subject to a maximum character limit of the notification 310, 410B on the computing device 110r.

The anticipated display size, maximum character limit, or other length threshold can be determined in various ways. For example only, in some implementations, the size/length threshold may be generated at the computing device 110, where the device model and other details of the computing device 110 are known. In such implementations, a mapping between the device model and/or other details of the computing device 110 and the size/length threshold can be generated and stored for use or transmission to the server computing device 120. In other implementations, the device model and/or other details (e.g., metadata such as screen resolution) of the computing device 110 can be transmitted to the server computing device 120 at which the size/length threshold is retrieved or generated. Other techniques for retrieving, generating, and/or obtaining a size/length threshold are within the scope of this disclosure.

As briefly mentioned above, in some implementations the messaging response language model 240 can be utilized by server computing device 120 to determine one or more suggested responses to a newly received electronic message at the receiving computing device 110r. In some implementations, the receiving computing device 110r will receive an electronic message (such as, electronic message 312) from a different server computing device, network, or other device that is separate from the server computing device 120 implementing the messaging response language model 240. In such situations, the receiving computing device 110r may transmit the newly received electronic message 312 and a request for one or more suggested responses to include in a notification (e.g., notification 310, 410B) or a GUI (e.g., GUI 500).

In some implementations, the receiving computing device 110r may transmit a single request for one or more full length suggested responses 616 to the electronic message 312, without transmitting any size or character threshold corresponding to a notification display size. In such implementations, the receiving computing device 110r may then generate the one or more suggested responses 316, 318 to include in a notification 310, 410B by filtering, extracting, or otherwise condensing the one or more full length suggested responses 616 received from the server computing device 120.

In further implementations, the receiving computing device 110r may transmit two distinct requests for a suggested response to the electronic message: a first request corresponding to one or more full length suggested responses 616, and a second request corresponding to one or more suggested responses 316, 318 that may be subject to a size or character threshold corresponding to a notification display size. In additional implementations, the receiving computing device 110r may transmit a single request for both: (i) one or more full length suggested responses 616, and (ii) one or more suggested responses 316, 318. In both of these implementations, the receiving computing device 110r will receive both of the one or more full length suggested responses 616 and the one or more suggested responses 316, 318, which can be displayed when is appropriate. It should be appreciated that, in these implementations, the content of the one or more full length suggested responses 616 and the one or more suggested responses 316, 318 may be identical (See, e.g., FIGS. 3 and 6 in which suggested response 316 and full length suggested response 616-1 both correspond to "Thanks").

In addition to the above, the content of the notifications (e.g., notification 310, 410A, and 410B) output by the receiving computing device 110r can be further dependent upon factors other than those described above. For example only, the messaging application can be configured to output notifications (notifications 310, 410B) that include one or more suggested responses 316, 318 in situations where there are one or more unread electronic messages (electronic message 312) in a single conversation. If, however, there are one or more unread electronic messages (electronic message 312) in multiple conversations, the notifications 310, 410B can be configured such that the electronic messages and no suggestions are displayed in a notification 310, 410B, e.g., in order to best utilize the available notification display space.

Furthermore, it is contemplated that—due to a messaging, processing, or other delay—an electronic message 312 may be received by the receiving computing device 110r before the one or more suggested responses 316 can be obtained. In such implementations, an initial notification 310, 410A, 410B can be generated and output by the receiving computing device 110R, wherein the notification 310, 410A, 410B includes the contents of the electronic message (or a portion thereof) and no suggested responses. When the one or more suggested responses 316, 318 are obtained (after outputting the initial notification), the initial notification can be updated to include the one or more suggested responses 316, 318. Similarly, if the one or more suggested responses 316 are received by the receiving computing device 110r before the electronic message 312 is received, the receiving computing device 110r may wait to generate any notifications until receiving the electronic message 312.

In yet further implementations, the receiving computing device 110r can be configured such that the one or more suggested responses 316, 318 that are output correspond to the most recently received unread electronic message (e.g., electronic message 312). In this manner, a notification 310, 410A, 410B can be updated as additional electronic messages 312 are received (e.g., in a single conversation) by obtaining and outputting the one or more suggested responses 316, 318 corresponding to the most recently received unread electronic message 312.

Figure 8:
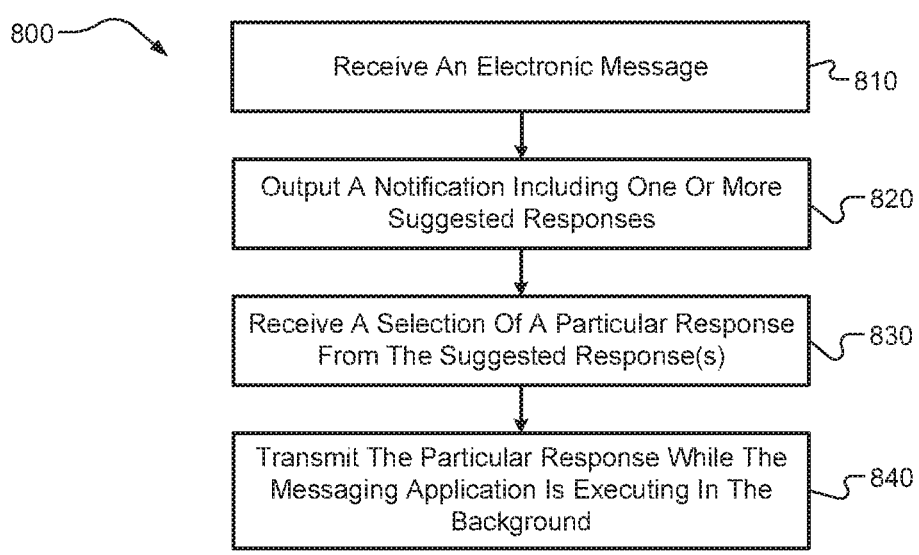
FIG. 8 is a flow diagram of an example technique for transmitting a response in a messaging application via a notification according to some implementations of the present disclosure.

Referring now to FIG. 8, a flow diagram of an example technique 800 for transmitting a response in a messaging application via a notification is illustrated. While the technique 800 will be described below as being performed by a computing device 110r, it should be appreciated that the technique 800 can be performed, in whole or in part, at another or more than one computing device 110 and/or the server computing device 120 described above.

At 810, the computing device 110 can receive receiving an electronic message 312 via a messaging application. The computing device 200 can further output (820) a notification 310, 410B of the electronic message 312 via a system level notification function when the messaging application is executing in a background of the computing device 110. The notification 310, 410B can include an identifier 314 of a sender of the electronic message 312, at least a portion of the electronic message 312, and one or more suggested responses 316, 318 to the electronic message 312. It should be appreciated that, although 820 provides that the notification 310, 410B of the electronic message 312 is output when the messaging application is executing in a background of the computing device 110, a notification 310, 410B of the electronic message 312 can also be output via a system level notification function when the messaging application is executing in a foreground of the computing device 110.

For example only, in some implementations a notification 310, 410B of the electronic message 312 can be output via a system level notification function when the computing device 110 is in a "locked" state and the messaging application is executing in a foreground of the computing device 110. In some such implementations, and as described above, the computing device 110 may output a notification 310, 410B while in the "locked" state, receive a user input corresponding to the user 110r selecting a particular suggested response 316 from the notification 310, 410B, and automatically transmit the particular suggested response 316 via the messaging application while the computing device is in the "locked" state and/or without "unlocking" the computing device 110r.

At 830, the computing device 110 can receive a selection of a particular response (316) of the one or more suggested responses 316, 318 via the notification 310, 410B. In response to the selection of the particular response 316, the computing device 110 can transmit, via the messaging application, the particular response 316 to the sender of the electronic message 312 while the messaging application is executing in the background of the computing device 110.

The methods and systems disclosed herein do not require collection, storage, or use of user data. In certain situations in which user data may be used, a user (such as users 110r and 110s) is provided with controls allowing the user to make an election as to both if and when systems, programs or features described herein may enable collection of user information (e.g., information about a user's current location, or information relating to a user's various alphanumeric candidates), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user has control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a computing device of a user having one or more processors, an electronic message via a messaging application;
   generating, at the computing device, one or more suggested responses to the electronic message;
   outputting, at the computing device while the messaging application is executing in a background of the computing device, a notification of the electronic message via a system level notification function, wherein the notification includes the one or more suggested responses to the electronic message;
   in response to receiving, at the computing device, first user input selecting a particular response of the one or more suggested responses of the notification, transmitting via the messaging application the particular response to a sender of the electronic message, while the messaging application is executing in the background of the computing device; and
   in response to receiving second user input, causing the messaging application to execute in a foreground of the computing device, presenting second suggested responses that include the one or more suggested responses and one or more additional suggested responses in a graphical interface of the messaging application, wherein each of the second suggested responses is selectable by third user input for transmission to the sender of the electronic message.

2. The computer-implemented method of claim 1, further comprising:
   in response to transmitting the particular response, indicating the electronic message as read, and
   removing the notification from a display of the computing device.

3. The computer-implemented method of claim 1, wherein the one or more suggested responses are determined by a trained language model, wherein the trained language model outputs a set of possible responsive messages and associated probability scores based on a preceding message and assigns a probability to a portion of the electronic message based on surrounding text, and further comprising determining the one or more suggested responses from the set of possible responsive messages.

4. The computer-implemented method of claim 1, wherein the notification includes a reply option selection area separate from the one or more suggested responses, and wherein the second user input includes selection of the reply option selection area.

5. The computer-implemented method of claim 1, wherein the electronic message is one of multiple unread electronic messages received at the computing device, wherein the notification includes the one or more suggested responses in response to the multiple unread electronic messages being in a single conversation, and wherein the notification excludes the one or more suggested responses in response to the multiple unread electronic messages being in multiple conversations.

6. The computer-implemented method of claim 1, wherein the notification further includes an identifier of a sender of the electronic message and at least a portion of the electronic message.

7. The computer-implemented method of claim 1, further comprising updating the one or more suggested responses to correspond to a most recently received unread electronic message in a conversation that includes more than one unread electronic messages.

8. The computer-implemented method of claim 1, further comprising obtaining, at the computing device, one or more potential responses, wherein the one or more suggested responses are one or more first suggested responses that are a subset of and based on the one or more potential responses, and wherein the one or more additional suggested responses are determined from the one or more potential responses.

9. The computer-implemented method of claim 8, wherein the one or more first suggested responses are smaller in length compared to corresponding responses of the one or more potential responses, and wherein the second suggested responses are full length responses of the one or more potential responses.

10. The computer-implemented method of claim 8, further comprising:
assigning priorities to the one or more potential responses based on a length of the one or more potential responses, wherein a priority associated with a first potential response of a first length is assigned a higher priority than a second potential response message of a second length when the first length is smaller than the second length; and
determining the one or more first suggested responses for the notification from the one or more potential responses based on the priorities assigned to the one or more potential responses.

11. The computer-implemented method of claim 8, wherein generating the one or more suggested responses is performed by another device and is based on the one or more potential responses and on a display size of the notification by the computing device, wherein the display size is determined by the other device based on characteristics of the computing device.

12. A system comprising:
one or more processors; and
logic encoded in one or more tangible media for execution by the one or more processors and when executed operable to perform operations comprising:
receiving, at a computing device of a user, an electronic message via a messaging application;
generating, at the computing device, one or more suggested responses to the electronic message;
outputting, at the computing device while the messaging application is executing in a background of the computing device, a notification of the electronic message via a system level notification function, wherein the notification includes the one or more suggested responses to the electronic message;
in response to receiving, at the computing device, first user input selecting a particular response of the one or more suggested responses of the notification, while the messaging application is executing in the background of the computing device
transmitting via the messaging application the particular response to a sender of the electronic message; and
in response to receiving second user input causing the messaging application to execute in a foreground of the computing device, presenting second suggested responses that include the one or more suggested responses and one or more additional suggested responses in a graphical interface of the messaging application, wherein each of the second suggested responses is selectable by third user input for transmission to the sender of the electronic message.

13. The system of claim 12, wherein the electronic message is one of multiple unread electronic messages received by the computing device, wherein the notification includes the one or more suggested responses in response to the multiple unread electronic messages being in a single conversation, and wherein the notification excludes the one or more suggested responses in response to the multiple unread electronic messages being in multiple conversations.

14. The system of claim 12, wherein the one or more suggested responses are determined by a trained language model, wherein the trained language model outputs a set of possible responsive messages and associated probability scores based on a preceding message, and further comprising determining the one or more suggested responses from the set of possible responsive messages.

15. The system of claim 12, further comprising obtaining, at the computing device, one or more potential responses, wherein the one or more suggested responses are one or more first suggested responses that are a subset of and based on the one or more potential responses, and wherein the one or more additional suggested responses are determined from the one or more potential responses.

16. The system of claim 15, wherein the one or more first suggested responses are smaller in length compared to corresponding responses of the one or more potential responses, and wherein the second suggested responses are full length responses of the one or more potential responses.

17. A non-transitory computer-readable medium storing instructions that, when executed by one or more processors, cause the one or more processors to perform operations comprising:
receiving, at a computing device of a user, multiple electronic messages via a messaging application;
outputting, at the computing device while the messaging application is executing in a background of the computing device, a notification of an electronic message of the multiple electronic messages via a system level notification function, wherein the notification includes one or more suggested responses to the electronic message in response to the multiple electronic messages being in a single conversation and wherein the notification excludes the one or more suggested responses to the electronic message in response to the multiple electronic messages being in multiple conversations;
receiving, at the computing device, a user selection of a particular response of the one or more suggested responses of the notification while the messaging application is executing in the background of the computing device; and
in response to receiving the user selection, transmitting via the messaging application the particular response to a sender of the electronic message, while the messaging application is executing in the background of the computing.

18. The non-transitory computer-readable medium of claim 17, wherein in response to receiving user input causing the messaging application to execute in a foreground of the computing device, presenting second suggested responses that include the one or more suggested responses and one or more additional suggested responses in a graphical interface of the messaging application, wherein each of the second suggested responses is selectable by third user input for transmission to the sender of the electronic message.

19. The non-transitory computer-readable medium of claim 18, further comprising obtaining, at the computing device, one or more potential responses, wherein the one or more suggested responses are one or more first suggested responses that are a subset of and based on the one or more potential responses, and wherein the one or more additional suggested responses are determined from the one or more potential responses.

20. The non-transitory computer-readable medium of claim 17, wherein the one or more suggested responses are determined by a trained language model, wherein the trained language model outputs a set of possible responsive messages and associated probability scores based on a preceding message, and further comprising determining the one or more suggested responses from the set of possible responsive messages.

* * * * *